(12) United States Patent
Kitabatake

(10) Patent No.: US 11,588,916 B2
(45) Date of Patent: Feb. 21, 2023

(54) INFORMATION PROCESSING APPARATUS, METHOD OF CONTROLLING INFORMATION PROCESSING APPARATUS, AND INFORMATION PROCESSING SYSTEM

(71) Applicant: Canon Kabushiki Kaisha, Tokyo (JP)

(72) Inventor: Nobuhiro Kitabatake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/467,694

(22) Filed: Sep. 7, 2021

(65) Prior Publication Data

US 2022/0078255 A1 Mar. 10, 2022

(30) Foreign Application Priority Data

Sep. 10, 2020 (JP) .............................. JP2020-152080

(51) Int. Cl.
| | |
|---|---|
| *G06F 16/58* | (2019.01) |
| *H04L 67/55* | (2022.01) |
| *G06F 16/535* | (2019.01) |
| *H04L 67/02* | (2022.01) |

(52) U.S. Cl.
CPC ............ *H04L 67/55* (2022.05); *G06F 16/535* (2019.01); *G06F 16/5866* (2019.01); *H04L 67/02* (2013.01)

(58) Field of Classification Search
CPC ....... H04L 67/55; H04L 67/02; G06F 16/535; G06F 16/5866; G06F 9/542
See application file for complete search history.

(56) References Cited

U.S. PATENT DOCUMENTS

| | | | |
|---|---|---|---|
| 10,637,946 B2 * | 4/2020 | Ruiz-Meraz | H04L 67/26 |
| 10,757,154 B1 * | 8/2020 | Jacobs | H04L 65/4076 |
| 10,778,833 B2 * | 9/2020 | Yalamanchili | H04M 1/72484 |
| 2014/0101230 A1 * | 4/2014 | Johnston | H04L 67/02 |
| | | | 709/203 |
| 2016/0062570 A1 * | 3/2016 | Dascola | G06F 1/163 |
| | | | 715/765 |
| 2016/0337299 A1 * | 11/2016 | Lane | H04L 51/26 |
| 2017/0230466 A1 * | 8/2017 | Carlos | H04L 67/1095 |
| 2020/0236183 A1 * | 7/2020 | Ghike | H04L 65/1069 |
| 2021/0044555 A1 * | 2/2021 | Orr | H04L 51/14 |

FOREIGN PATENT DOCUMENTS

JP 2019021342 A 2/2019

* cited by examiner

*Primary Examiner* — Chirag R Patel

(74) *Attorney, Agent, or Firm* — Venable LLP

(57) ABSTRACT

An information processing apparatus includes a first obtaining unit configured to obtain a notification information set from a cloud storage, a second obtaining unit configured to transmit user ID information of a user using the information processing apparatus to a cloud server, and to obtain notification ID information transmitted from the cloud server in response to the transmitted user ID information, and a determination unit configured to determine the notification information included in the notification information set obtained by the first obtaining unit and corresponding to the notification ID information obtained by the second obtaining unit as notification information of a display target.

14 Claims, 18 Drawing Sheets

| TRIGGER EVENT FOR INFORMATION TRANSMISSION | INFORMATION TO BE TRANSMITTED | | | |
|---|---|---|---|---|
| | TIME | CATEGORY | ACTION | LABEL |
| NEW PHOTO ALBUM CREATED | DATE AND TIME OF OCCURRENCE OF EVENT | "EDIT" | "CREATE" | (ALBUM ID) |
| PHOTO ALBUM ADDED TO CART | DATE AND TIME OF OCCURRENCE OF EVENT | "CART" | "ADD" | (ALBUM ID) |
| PAYMENT FOR PHOTO ALBUM COMPLETED | DATE AND TIME OF OCCURRENCE OF EVENT | "CART" | "PAYMENT" | (ALBUM ID) |

FIG.3

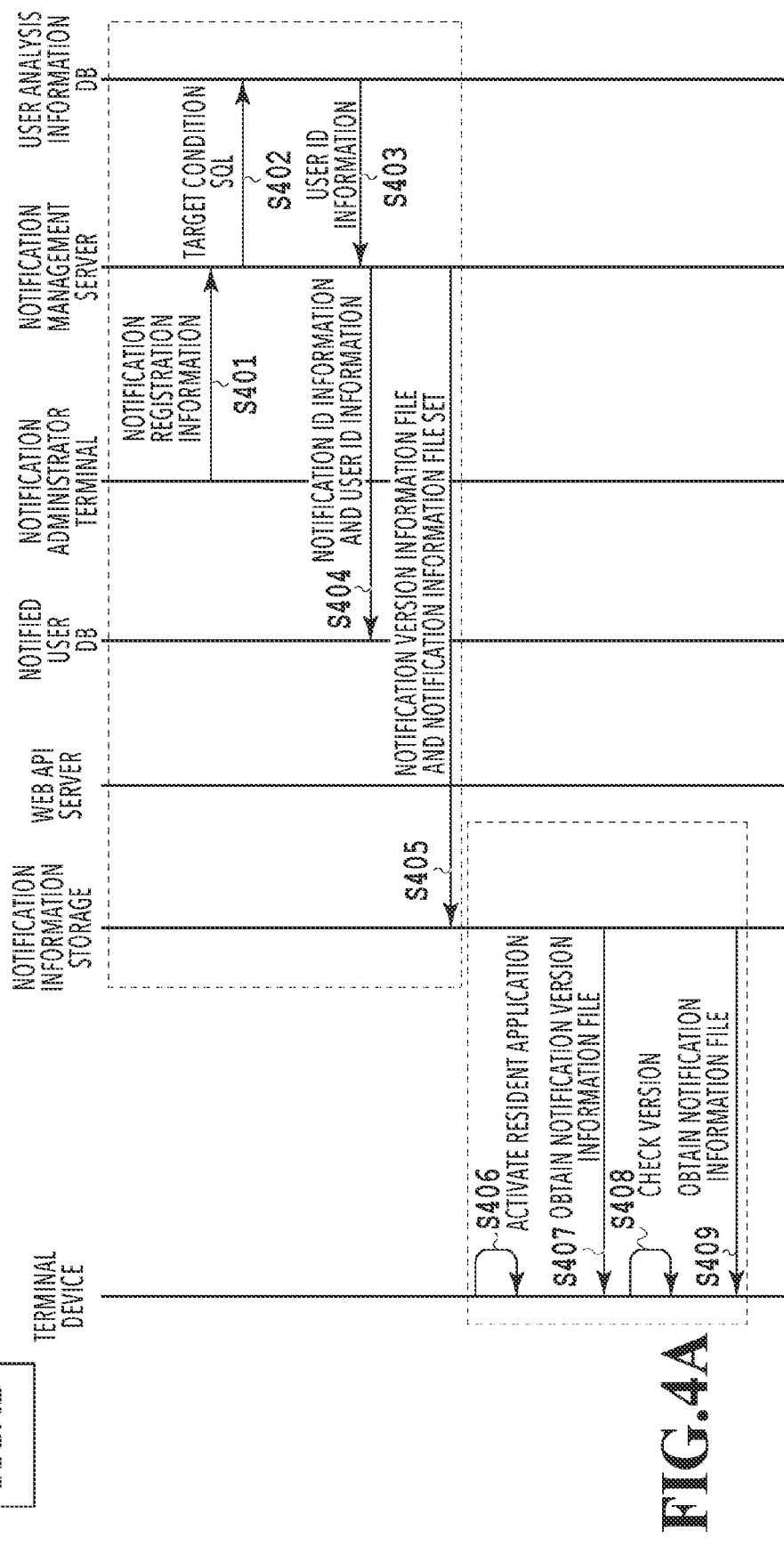

| CONDITION NO. | TARGET CONDITION | INFORMATION TO BE INCLUDED IN NOTIFICATION REGISTRATION INFORMATION | DATE AND TIME OF UPDATE OF NOTIFIED USER DB |
|---|---|---|---|
| 0 | ALL USERS | — | NONE |
| 1 | USER WHO HAS COMPLETED PAYMENT WITHIN DESIGNATED PERIOD | START DATE AND END DATE OF "DESIGNATED PERIOD" | DATE AND TIME OF START OF NOTIFICATION |
| 2 | USER WHO HAS NEVER COMPLETED PAYMENT IN PAST | — | DATE ANT TIME OF START OF NOTIFICATION, 00:00 EVERY SATURDAY |
| 3 | USER WHO HAS COMPLETED PAYMENT IN PAST | — | DATE ANT TIME OF START OF NOTIFICATION, 00:00 EVERY SATURDAY |
| 4 | USER USING APPLICATION OF OLDER VERSION THAN DESIGNATED VERSION NUMBER | VERSION NUMBER | NONE |

FIG.5

| IDENTIFICATION | USER ID |
|---|---|
| 20200601000003220c8a3846ca | abcdefg |
| 20200601000003220c8a3846ca | dosfijn |
| 20200601000003220c8a3846ca | 9wejfai |
| 20200611000000jfaw9jg8tl2ugyd | abcdefg |
| 20200611000000jfaw9jg8tl2ugyd | jr8j25hj |

FIG.6

```
{
   "version":"20200802150052",
   "urls": {
      "20200802150052":"https://example.com/20200802150052.zip",
      "20200730110039":"https://example.com/20200802150052_20200730110039.zip",
      "20200728160050":"https://example.com/20200802150052_20200728160050.zip",
      "20200728120059":"https://example.com/20200802150052_20200728120059.zip",
      "20200726030058":"https://example.com/20200802150052_20200726030058.zip",
      "20200726005457":"https://example.com/20200802150052_202007260054.zip"
   }
}
```
FIG.7A
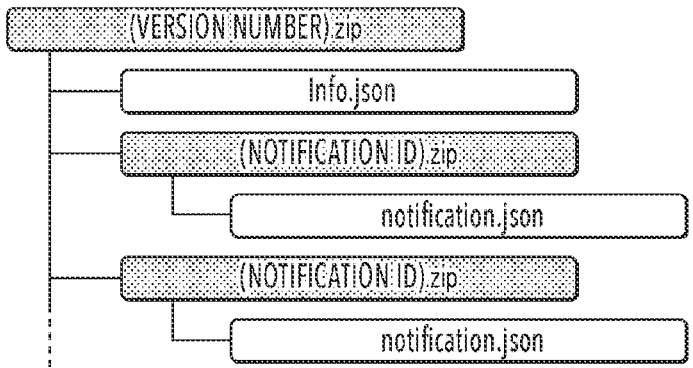
FIG.7B
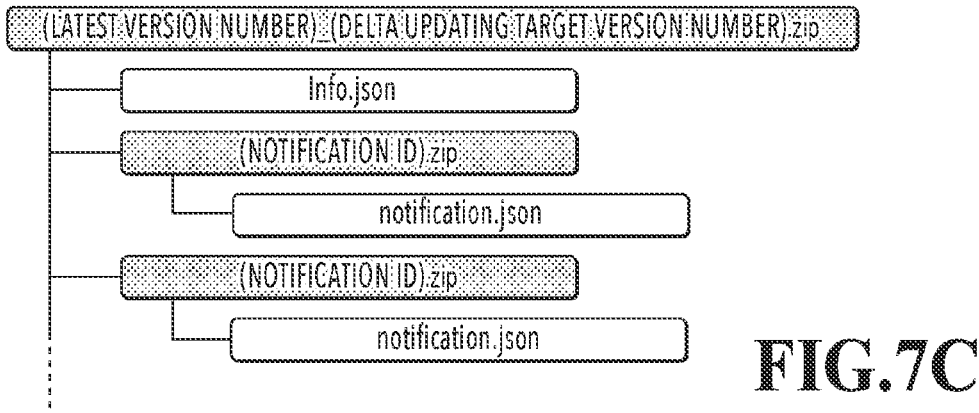
FIG.7C
```
{
   "files": [
      "20200612000051 89d0e536247f.zip",
      "20200601000003 220c8a3846ca.zip",
      "20200512000001 bebed976c00d.zip"
   ],
   "version":"20200612095406",
}
```
FIG.7D

```
{
    "identification":"2020061200005189d0e536247f",
    "startDate":"2020-06-12T00:00:00+0900",
    "endDate":"2020-07-10T00:00:00+0900",
    "message":"fgdfgdfg",
    "displayTiming": 1
    "priority": 2
    "targetingType":"all"
    "targetingParams": { }
}
```

FIG.8A

```
{
    "identification":"20200601000003220c8a3846ca",
    "startDate":"2020-06-01T00:00:00+0900",
    "endDate":"2020-7-10T00:00:00+0900",
    "message":"fgdfgdfg",
    "displayTiming": -1
    "priority": 1
    "targetingType":"apiRequest"
    "targetingParams":{ }
}
```

FIG.8B

```
{
    "identification":"20200512000001bebed976c00d",
    "startDate":"2020-05-12T00:00:00+0900",
    "endDate":"2020-06-10T00:00:00+0900",
    "message":"fgdfgdfg",
 "displayTiming":1
 "priority":2
 "targetingType":"appVer"
 "targetingParams": {
    "appVerLessThan":"2.1.0
  }
}
```

FIG.8C

```
{
    "result":"Success",
    "messages": [
    {
      "identification":"20200110000jfa9wejf3qg454h5arg"
    },
    {
      "identification":"20200101000aowiej9erg5nba65weo"
    }
    ]
}
```

FIG.9

| CONDITION NO. | TARGET CONDITION | INFORMATION TO BE INCLUDED IN NOTIFICATION REGISTRATION INFORMATION | DATE AND TIME OF UPDATE OF NOTIFIED USER DB |
|---|---|---|---|
| 0 | ALL USERS | — | NONE |
| 1 | USER WHO HAS COMPLETED PAYMENT WITHIN DESIGNATED PERIOD | START DATE AND END DATE OF "DESIGNATED PERIOD" | DATE ANT TIME OF START OF NOTIFICATION |
| 2 | USER WHO HAS NEVER COMPLETED PAYMENT IN PAST | — | DATE ANT TIME OF START OF NOTIFICATION, 00:00 EVERY SATURDAY |
| 3 | USER WHO HAS COMPLETED PAYMENT IN PAST | — | DATE ANT TIME OF START OF NOTIFICATION, 00:00 EVERY SATURDAY |
| 4 | USER USING APPLICATION OF OLDER VERSION THAN DESIGNATED VERSION NUMBER | VERSION NUMBER | NONE |
| 5 | CART-ABANDONING USER (USER WHO HAS NOT COMPLETED PAYMENT FOR MORE THAN TWO DAYS BUT LESS THAN FOURTEEN DAYS AFTER PUTTING ALBUMS INTO CART) * DISPLAY NOTIFICATION FOR EACH ALBUM | — | 00:00 EVERY DAY |

FIG.13

| IDENTIFICATION | USER ID | ITEM ID |
| --- | --- | --- |
| 20200601000003220c8a3846ca | abcdefg | |
| 20200601000003220c8a3846ca | dosfijn | |
| 20200601000003220c8a3846ca | 9wejfai | |
| 20200611000000jfaw9jg8tl2ugyd | abcdefg | |
| 20200611000000jfaw9jg8tl2ugyd | jr8j25hj | |
| 20200202000000ar03bk27fjod | abcdefg | 20200531kf8h2hgokodk |
| | | 20200605kfg4kg5dlhow |
| 20200202000000ar03bk27fjod | dosfijn | 20200601kf72hbl59gijh |

FIG.14

```
{
    "identification":"20200202000000ar03bk27fj0d",
    "startDate":"2020-02-02T00:00:00+0900",
    "endDate":"2020-03-10T00:00:00+0900",
    "message":"fgdfgdfg",
    "displayTiming":-1
    "priority":1
    "targetingType":"apiRequestMulti"
    "targetingParams": { }
}
```

FIG.15

```
{
    "result":"Success",
    "messages": [
    {
        "identification":"20200110000jfa9wejf3qg454h5arg"
    },
    {
        "identification":"20200101000aowiej9erg5nba65weo"
    },
    {
        "identification":"20200202000000ar03bk27fj0d",
        "ItemID":"20200531kf8h2hgokodk"
    },
    {
        "identification":"20200202000000ar03bk27fj0d",
        "ItemID":"20200605kfg4kg5dlhow
    }
    ]
}
```

FIG.16

INFORMATION PROCESSING APPARATUS, METHOD OF CONTROLLING INFORMATION PROCESSING APPARATUS, AND INFORMATION PROCESSING SYSTEM

BACKGROUND OF THE INVENTION

Field of the Invention

The present disclosure relates to a technique for controlling a notification to be displayed on a terminal device.

Description of the Related Art

There has been known a push notification function which allows a server to notify of campaign information, maintenance information, or the like on a service provided by an application that runs on a smartphone or a personal computer (PC).

According to a technique disclosed in Japanese Patent Laid-Open No. 2019-21342 (hereinafter referred to as Reference 1), a silent push notification is once transmitted from a notification server to all user terminals. Then, each user terminal inquires of a determination device on the server side about whether or not it is appropriate to display the notification, and then performs control as to whether or not to display the notification on a screen of the user terminal depending on a result of determination by the determination device. The silent push notification discussed herein corresponds to a push notification of a kind that is designed to allow the application side to receive data only without performing any processing for directly displaying a message or the like. The push notification of this kind is carried out by using a mechanism of an OS.

SUMMARY OF THE INVENTION

According to Reference 1, every time a certain notification is carried out, the notification needs to be delivered to all the user terminals by way of the silent push notification. Moreover, the processing for inquiring of the determination device on the server side about the determination of the notification is carried out in each case. As a consequence, the more the contents of notifications are increased, the more processing costs on the server and more communication costs are increased. In the meantime, a PC application or the like, which cannot adopt a push notification by using the mechanism of the OS, cannot display an appropriate notification on user terminals.

An information processing apparatus according to an aspect of the present invention is capable of communicating with a cloud storage to store a notification information set being a set of notification information including contents of the notification and notification identification information, and with a cloud server capable of accessing a management unit to perform management while associating user identification information of a user corresponding to a target condition indicating a notification target of the contents of the notification with the notification identification information. The information processing apparatus includes a first obtaining unit configured to obtain the notification information set from the cloud storage, a second obtaining unit configured to transmit the user identification information of a user using the computer to the cloud server, and to obtain the notification identification information transmitted from the cloud server in response to the transmitted user identification information, and a determination unit configured to determine the notification information included in the notification information set obtained by the first obtaining unit and corresponding to the notification identification information obtained by the second obtaining unit as notification information of a display target.

Further features of the present invention will become apparent from the following description of exemplary embodiments with reference to the attached drawings.

BRIEF DESCRIPTION OF THE DRAWINGS

FIG. 3 is a table showing examples of user analysis information:

FIG. 4 is a diagram showing the relationship of FIGS. 4A and 4B;

FIGS. 4A and 4B are totally a sequence diagram applicable to the information processing system;

FIG. 5 is a table for explaining target conditions;

FIG. 6 is a table showing example of DB managed by a notified user DB:

FIGS. 7A to 7D are diagrams showing configuration examples of files created by a notification management server;

FIGS. 8A to 8C are diagrams showing description examples of a notification information file;

FIG. 9 is a diagram showing an example of a response body of information transmitted from a Web API server;

FIG. 13 is a table showing target conditions;

FIG. 14 is a table showing examples of data structures to be registered with the notified user DB;

FIG. 15 is a diagram showing an example of a notification information file in a case of multiple notifications:

FIG. 16 is a diagram showing an example of a response body of information to be transmitted from the Web API server.

DESCRIPTION OF THE EMBODIMENTS

Embodiment of the present invention will be described below with reference to the drawings. It is to be noted that the following embodiments are not intended to limit the scope of the present invention. Meanwhile, a combination of all characteristic features described in the embodiments is not always essential to a solution of the present invention. In the following description, the same constituents will be denoted by the same reference signs.

FIRST EMBODIMENT

<System Configuration>

Figure 1:
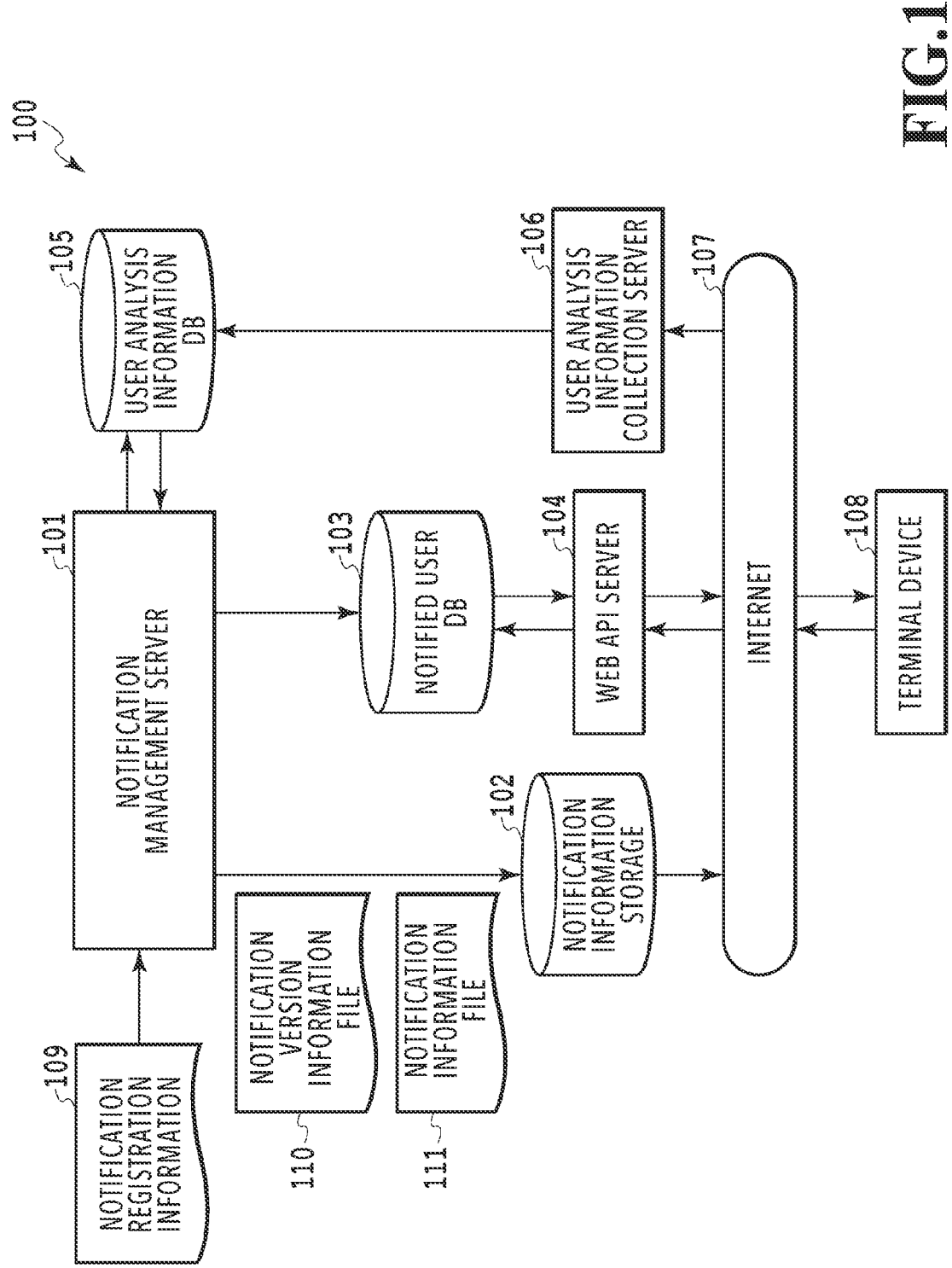
FIG. 1 is a configuration diagram of an information processing system.

FIG. 1 is a configuration diagram of an information processing system 100 according to the present embodiment. The information processing system 100 is broadly divided into a terminal device 108 which is a device on a user side, and various devices on a cloud server side. The devices on the cloud server side include a notification management server 101, a notification information storage 102, a notified user database (DB) 103, a Web API server 104, a user analysis information DB 105, and a user analysis information collection server 106. The notification information storage 102 is a storage server of a cloud type (a cloud storage).

For example, a desktop PC, a notebook PC, a tablet terminal, a portable terminal such as a smartphone, or the like is used as the terminal device 108. The terminal device 108 includes an operating system (OS), and applications of which operations will be described later. Though either the Windows or the macOS is assumed to be the OS in the present embodiment, any other OS is acceptable instead. The terminal device 108 is capable of accessing the notification information storage 102, the Web API server 104, and the user analysis information collection server 106 through the Internet 107. The terminal device 108 does not directly communicate with the notification management server 101, the notified user DB 103, or the user analysis information DB.

The user analysis information collection server 106 is a server which collects attribute information on users and action information of the users on applications transmitted from the terminal device 108 (hereinafter collectively referred to as user analysis information). The user analysis information collection server 106 stores the collected user analysis information in the user analysis information DB 105.

The notification management server 101 obtains notification registration information 109 including target conditions. The target conditions are conditions serving as targets for notification. Though details will be described later, a notification administrator registers a notification targeted at all users or a notification targeted at a specific user as the notification registration information 109. In the meantime, contents of the notifications to be displayed on the terminal device 108 are also included in the notification registration information 109. The notification management server 101 obtains the notification registration information 109, which includes the target conditions and the contents of notifications as described above, from a notification administrator terminal (not shown) operated by the notification administrator, for example. The notification registration information 109 is transmitted from the notification administrator terminal (not shown) to the notification management server 101 by using an application for transmitting the notification registration information.

The notification management server 101 creates notification identification information (also referred to as notification ID information) corresponding to the notification registration information 10). This notification ID information is used as identification information unique to "notification information" determined based on the notification registration information 109. Note that the "notification registration information" and the "notification information" include the same contents of the notification in this specification. Nevertheless, the "notification information" is different from the "notification registration information" in that the former information includes the notification ID information created by the notification management server 101 and also includes target types corresponding to the target conditions instead of including the target conditions. The target types will be described later. While the present embodiment describes the example in which the notification management server 101 creates the notification ID information, the notification registration information 109 in a state of including the notification ID information may be transmitted to the notification management server 101 and the notification management server 101 may obtain the notification ID information from the notification registration information 109 instead.

In the meantime, the notification management server 101 has a function to obtain user identification information (also referred to as user ID information), which corresponds to a certain target condition included in the notification registration information 109, from the user analysis information DB 105. Moreover, the notification management server 101 associates the created notification ID information with the obtained user ID information, and stores the associated information in the notified user DB 103. The notified user DB 103 functions as a management unit that manages the user ID information and the notification ID information associated with each other. The Web API server 104 capable of communicating with the notified user DB 103 can obtain the notification ID information associated with the user ID information by checking the notified user DB 103.

Meanwhile, the notification management server 101 stores a notification information file 111 and a notification version information file 110 in the notification information storage 102. The notification information file 111 contains notification information that includes contents of the notification to be actually notified by the terminal device 108 and the notification ID information. Details of the notification information file 111 and of the notification version information file 110 will be described later. The terminal device 108 capable of communicating with the notification information storage 102 can obtain the notification information file 111 by accessing the notification information storage 102.

The Web API server 104 inquires of the notified user DB 103 by using the user ID information transmitted as a request parameter from the terminal device 108. The Web API server 104 is a server having a function to transmit the notification ID information associated with the user ID information in the notified user DB 103 to the terminal device 108 as a response.

Specifically, the terminal device 108 can obtain the notification information file that includes the notification ID information and the contents of the notification by accessing the notification information storage 102. Moreover, the terminal device 108 can obtain the notification ID information associated with the user ID information by accessing the Web API server 104. Then, the terminal device 108 carries out processing to notify of (display) the contents of the notification corresponding to the obtained notification ID information on a screen of the terminal device 108 by referring to the notification information file.

<Hardware Configuration>

Figure 2:
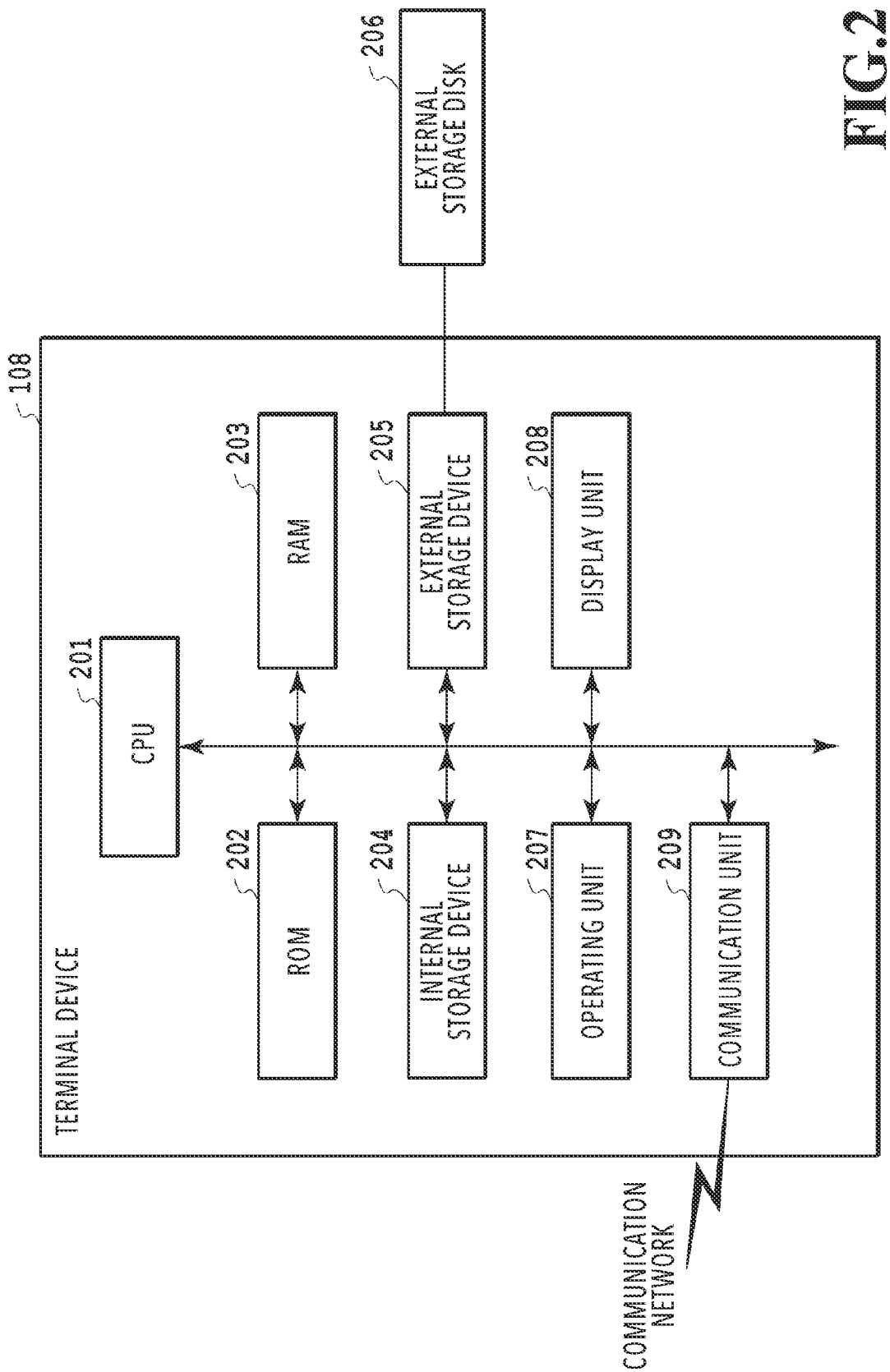
FIG. 2 is a block diagram showing a schematic hardware configuration of a terminal device.

FIG. 2 is a block diagram showing a schematic hardware configuration of the terminal device 108. The terminal device 108 includes a CPU 201, a ROM 202, a RAM 203, an internal storage device 204, an external storage device 205, an operating unit 207, a display unit 208, and a communication unit 209. The CPU 201 is configured to control operations of the entire terminal device 108 through a system bus in accordance with programs read out of the ROM 202, the RAM 203, the internal storage device 204, or an external storage disk 206. The ROM 202 stores control programs for the CPU 201 and the like. The RAM 203 is provided for temporarily storing programs or image data so as to operate processing by the terminal device 108 at high speed. The internal storage device 204 stores the operating system, various application programs, image data, and the like. Usually, these application programs are installed by receiving data from the external storage disk 206 (such as a CD or DVD medium) serving as a computer readable medium storing the application programs and controlling the external storage device 205. The operating unit 207 inputs an instruction from a user by controlling a keyboard or a mouse (not shown). The display unit 208 is configured to perform various displays for the user. The communication unit 209 is associated with a communication network and performs data communication through the connection to an Internet provider. Although the configuration of the terminal device 108 has been described in FIG. 2 as a configuration of an information processing apparatus, each server in FIG. 1 may also have the same configuration. Note that the operating unit 207, and the display unit 208, and the like may be provided as structures outside the apparatus. In the meantime, while each server in FIG. 1 is formed from a single server apparatus (the information processing apparatus), each server may be formed from two or more information processing apparatuses. In other words, each server may be configured as a server system formed from one or more servers.

<<Configurations of Applications>>

The applications to be executed by the terminal device 108 will be described. The applications of the present embodiment include a main application and a resident application. The main application is an application to be activated by an execution file that provides a main function of the applications.

The main application of the present embodiment is an application that provides functions to read an image file in the terminal device 108, to create a photo album, and to place an order for the photo album. The main application includes the steps of newly creating a photo album, and editing the photo album. Moreover, the main application includes the steps of uploading the created photo album to a not-illustrate server and putting the photo album into an e-commerce cart, and making a payment for the photo album put in the cart. The user analysis information on the user who uses the main application is collected in the user analysis information collection server 106.

The resident application is an application to be activated by an execution file that provides a notification function to be described mainly in the present embodiment. The resident application is made resident by setting so as to activate the resident application at the time of account log-in of the OS in the case of installing the main application.

<Collection of User Analysis Information>

FIG. 3 is a table showing examples of the user analysis information. A description will be given of collection examples of the user analysis information. In the case where the main application is activated or in the case where a certain action takes place in the main application, the main application (the terminal device 108) transmits the user analysis information to the user analysis information collection server 106 together with the user ID information. FIG. 3 shows examples of the information to be transmitted as the user analysis information and triggers therefor. For instance, a case of adding the photo album to the cart in the main application will be used as an example. In this case, date and time of occurrence of this event (addition to the cart in this case), "Cart" as a category, "add" as an action, and "album ID" as a label are transmitted collectively as the user analysis information to the user analysis information collection server 106.

The user ID information is a character string for identifying the user, which is automatically created in the application at the time of first activation after installation of the applications (the main applications and the resident application). In the present embodiment, the main application and the resident application use the same user ID information as the user ID information for a user A, who uses the terminal device 108.

The user analysis information collection server 106 carries out processing to write the collected user analysis information in the user analysis information DB 105 once in every eight hours, for example. The user analysis information collection server 106 may be a server system serving as a so-called tracking tool for the applications, or more specifically, a server that provides services such as Google Analytics or a server system equivalent thereto.

<<Flow of Notification Management>>

Figure 4B:
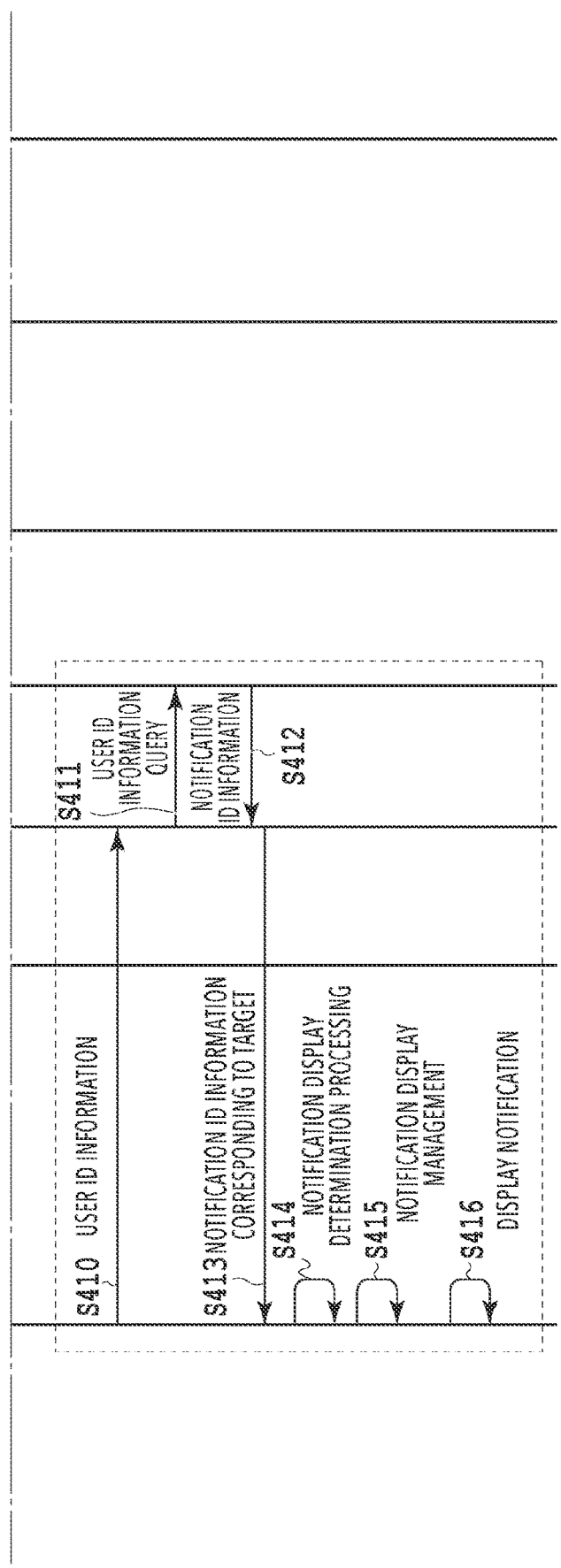

FIGS. 4A and 4B are totally a sequence diagram applicable to the information processing system 100 of the present embodiment. A processing sequence in FIGS. 4A and 4B is implemented by causing the CPU of each apparatus to read the program stored in the ROM or the like and to load the program in the RAM, and then to execute the program. Note that a symbol "S" in the description of each processing represents a step in the sequence. Now, the processing sequence concerning the notification management will be described below.

In S401, the notification management server 101 obtains the notification registration information 109 from the notification administrator terminal. The notification registration information 109 includes the following information:

date of start of notification;
date of end of notification;
target conditions;
contents of notification;
timing of notification; and
priority of notification.

The notification registration information 109 is stored in the notification management server 101 and held by the notification management server 101 until the date of end of notification.

FIG. 5 is a table for explaining the target conditions. The target conditions are predetermined conditions as shown in FIG. 5. The notification management server 101 refers to designation of any of the target conditions included in the notification registration information 109, and creates an SQL sentence to extract the user ID information corresponding to the target condition from the user analysis information DB 105. If the condition is "a user who has completed a payment within a designated period", for example, the SQL sentence is created by storing portions in the notification management server 101 in advance except a portion to input the date and time of the designated period, and then rewriting only the variable portion such as the "designated period".

Here, each "target condition" to be included in the notification registration information 109 is transmitted to the notification management server 101 in the form of incorporating the corresponding "condition No." and the corresponding information described in "information to be included in the notification registration information" in FIG. 5 into the notification registration information 109.

In S402, the notification management server 101 transmits the SQL sentence to extract the user ID information that matches the target condition to the user analysis information DB 105. The user analysis information DB 105 extracts the user ID information in accordance with the SQL sentence and transmits the extracted user ID information to the notification management server 101. In S403, the notification management server 101 obtains the user ID information extracted by the user analysis information DB.

In S404, the notification management server 101 associates the user ID information obtained in S403 with the notification ID information created for the notification registration information obtained in S401, and writes the associated pieces of information in the notified user DB 103.

FIG. 6 is a table showing example of DB managed by the notified user DB 103. The notified user DB 103 is a NOSQL DB of a key-value type, and a structure of the DB is as illustrated in FIG. 6. As shown in FIG. 6, each piece of the user ID information (user ID) and the corresponding piece of the notification ID information (identification) are stored in the state of being associated with each other. In FIG. 6, the information "identification" is set to a main key (a partition key) and the information "user ID" is set to a sub key (a sort key).

In a period while the corresponding notification is valid, the processing from S402 to S404 is subjected to execution of update based on a timer in accordance with information on "date and time to update notified user DB" in FIG. 5. If the "date and time to update notified user DB" shows "none" in FIG. 5, then the processing from S402 to S404 is not executed.

In S405, the notification management server 101 checks whether or not it is the date and time to start the notification, and updates the files stored in the notification information storage 102 at the timing of the date and time to start. Specifically, the notification management server 101 creates a notification information file set, a differential information file set, and a notification version information file by using the notification registration information obtained in S401 and the created notification ID information. Then, the files stored in the notification information storage 102 are updated with the files thus created.

FIGS. 7A to 7D are diagrams showing configuration examples of the files created by the notification management server 101. FIG. 7A shows an example of the notification version information file. A version number (version) indicating the created date and time, and a URL for the notification information file set (a ZIP file) of the latest version are described in the notification version information file. In the example of FIG. 7A, the first row of "urls" section indicates the URL of the notification information file set of the latest version. In the meantime, the notification version information file also describes version numbers of the past five generations and URLs for differential information file sets for delta updating from the respective versions to the latest version.

In the example of FIG. 7A, the URLs for the differential information file sets for delta updating from the respective versions to the latest version are described on the second to sixth rows of the "urls" section.

FIG. 7B shows an example of a configuration of the notification information file set of the latest version. Here, "(version number).zip" file represents an entity file of the notification information file set of the latest version at the destination of the URL on the first row of the "urls" section in FIG. 7A. This "(version number).zip" file includes "Info.json" file and "(notification ID).zip" files in the number corresponding to the number of the notification information files. Each "(notification ID).zip" file includes "notification.json" file that describes each piece of the notification information (inclusive of the contents of notification).

FIG. 7C shows an example of the differential information file set. Here, "(latest version number)_(delta updating target version number).zip" file represents an entity file of the differential information file set at the destination of the URL on each of the second to sixth rows of the "urls" section in FIG. 7A. The "(latest version number)_(delta updating target version number).zip" file includes the following files. Specifically, this file includes "Info.json" file which is the same as the "Info.json" file included in the notification information file set of the latest version, and the "(notification ID).zip" file that is added in the progress from the delta updating target version to the latest version.

FIG. 7D shows a description example of the "Info.json" file. The "Info.json" file is constructed from the following contents:
 "version": a version number which is a character string describing the date and time of release in yyyyMMddHHmmss format; and
 "files": a list of files included in the notification file set of the latest version except the "Info.json" files; a set of the notification information files described in this file list is also referred to as a notification information set.

FIGS. 8A to 8C are diagrams showing description examples of the notification information file (notification.json). FIGS. 8A to 8C show description examples of the notification information file (notification.json) while changing some of parameters therein, respectively. Each notification information file (notification.json) of the present embodiment includes the following contents;
 identification: the notification ID:
 startDate: the date and time of start of notification;
 endDate: the date and time of end of notification;
 message: a message statement (the contents of notification) to be displayed as a notification on a desktop;
 displayTiming: a key for setting timing to display the notification: the notification shall be displayed immediately in the case where this item is set to a value −1 whereas a natural number equal to or above 0 instructs display after a lapse of a designated period of time after activating the resident application while reading the numerical value in the unit of minute, or a specific clock time may be designated as this value instead;
 priority: a value of priority to be referred to for determining which notification shall be displayed in case of overlapping timings for displaying two or more notifications; where 1 is deemed to be the highest priority while the lager the value the lower the priority thereafter,
 targetingType: the target type corresponding to any of the target conditions in FIG. 5, in which a value "all" is set in a case where the target condition in FIG. 5 designates "all users", a value "appVer" is set in a case where the target condition designates a "user who uses an application of an older version than a designated version number" which allows a client application side to determine whether to display or not to display, or a value "apiRequest" in set in other cases of a condition to be checked by transmitting a request to a corresponding WebAPI server: and
 targetingParams: this is an item to describe parameters necessary for condition determination in the case where the target condition defines the condition to allow the client application side to determine whether to display or not to display: the targetingType name and the targetingParams corresponding thereto which are agreed between the server side and the client application side in advance are described in this item; and in the case of the present embodiment, this item is used only if the "targetingType" item has the value of "appVer", where "appVerLessThan" key and the version number set in the notification registration information 109 and representing the value of this key are described as shown in FIG. 8C.

Back to FIG. 4A, the description of the sequence diagram will be continued. In S406, the resident application is activated on the terminal device 108. Here, the activation of the resident application is assumed to be carried out in S406. However, the activation is merely assumed to be carried out in S406 for the convenience of explanation, and the resident application may be activated at any timing.

After the activation of the resident application, the resident application obtains the notification version information file from the notification information storage 102 in S407. Here, the notification version information file is obtained at the time of activation of the resident application and at an interval of a given time period thereafter. Such a given time period may be defined as an interval of 24 hours, for example.

In S408, the resident application compares the version described in the "Info.json" file in the notification information file set previously obtained by the resident application and saved in the terminal device 108 with the version in the notification version file obtained in S407. Then, the resident application determines whether or not the notification information file is to be obtained. In the case where the version in the "Info.json" file stored in the terminal device 108 has the earlier date than that of the version in the notification version file, the resident application determines to obtain the notification information file and carries out processing in S409 to be described later. If not, the resident application proceeds to S410 without carrying out S409.

In S409, the resident application downloads a target ZIP file from the destination of the URL in the notification information storage 102 described in the notification version information file. In this instance, if there is the differential information file set corresponding to the version of the "Info.json" file stored in the terminal device 108, then the resident application downloads the corresponding file. If there is not the corresponding differential information file set or there is not the "Info.json" file, then the resident application downloads the notification information file set that includes all the notification information files.

In the case of downloading the differential information file set, the resident application replaces the "Info.json" file stored in the terminal device 108 with the "Info.json" file included in the downloaded differential information file set. In the meantime, the resident application stores the "(notification ID).zip" file in a predetermined folder. Thereafter, the resident application checks the file list described in the "Info.json" file as to whether or not there is any "(notification ID).zip" file that is not described in the list, and deletes the not-described file from the terminal device 108 if applicable.

On the other hand, in the case where the full notification information file set is downloaded instead of the differential information file set, the resident application stores the "Info.json" file and the "(notification ID).zip" file in the predetermined folder in the terminal device 108. After the above-described processing, all the latest notification information files are stored in the terminal device 108. While the notification information (the contents of notification) related to the terminal device 108 may be included in the notification information files, notification information not related to the terminal device 108 may also be included therein. In other words, all the latest notification information is stored in the terminal device 108 irrespective of whether or not the terminal device 108 actually carries out the notification.

Thereafter, processing in S410 is carried out at a predetermined timing. In S410, the resident application transmits a request which includes the user ID information as a request parameter to the Web API server 104. In S410, the resident application requests for the notification ID information on the notification to which the target condition of the type of "causing the server to determine whether or not to correspond to the target condition" (see FIG. 8B) is set, where the target condition corresponds to the user ID information to be transmitted.

In S411, the Web API server 104 transmits a query that uses the user ID information transmitted from the resident application (the terminal device 108) to the notified user DB 103. Specifically, the Web API server 104 transmits the query for obtaining the notification ID information associated with the user ID information to the notified user DB 103. Then, in S412, the Web API server 104 obtains the corresponding notification ID information.

In S413, the Web API server 104 delivers the notification ID information obtained from the notified user DB 103 in S412 back to the resident application as a response to the request transmitted in S410.

FIG. 9 is a diagram showing an example of a response body of the information transmitted from the Web API server 104 to the resident application as the response. In the example of FIG. 9, two pieces of the notification ID information are delivered as the response to the requested user ID information. In this way, the resident application can obtain the notification ID information for identifying the notification information to be notified by the terminal device 108.

The present embodiment has described the example in which the resident application transmits the user ID information as the request parameter in S410 and obtains the corresponding notification ID information as the response in S413. However, the present invention is not limited only to this example. For instance, the resident application transmits the notification ID information included in the notification information file to the Web API server 104 together with the user ID information collectively as the request parameters. Then, the resident application may deliver information as to whether or not the user involved in the user ID information corresponds to the target condition in the notification ID information. In this case, instead of determining the user corresponding to the target information on the server side in advance as in the present embodiment, the server side may determine whether or not the user corresponds to the target condition at a time point of arrival of the request.

In S414, the resident application carries out notification display determination processing. In the notification display determination processing, the notification of a display target and a timing thereof are determined. The resident application stores the notification, of which the display timing is determined, in a memory of the application. Specifically, the resident application stores the notification ID information of the notification of which the display timing is determined and notification time thereof in a determined notification display list in the memory of the application. Note that details of the notification display determination processing will be described later. The processing from S410 to S414 is assumed to be carried out at the time of activation of the resident application and at an interval of a given time period thereafter. Such a given time period may be defined as an interval of 1 hour, for example.

In S415, the resident application checks the determined notification display list once in every predetermined time period (such as every 1 minute). and confirms whether or not there is the notification that reaches the notification time or has passed the notification time. If there is the applicable notification, the resident application obtains the notification information on the notification, calls the API of the OS, and carries out display control in order to display the notification. Meanwhile, the resident application deletes the displayed notification from the determined notification display list, and saves a display history of the displayed notification in the terminal. To be more precise, the notification display history is a list of the notification ID information displayed in the past.

In S416, the OS displays the notification on a desktop screen. In the present embodiment, the notification is displayed on the desktop screen by using a "toast" function in the case where the Windows is the OS or by using a "notification" function in the case w % here the macOS is the OS. By carrying out the above-mentioned processing. it is possible to realize the notification to a specific target without adopting the push notification by using the mechanism of the OS.

<Notification Display Determination Processing>

Figure 10:
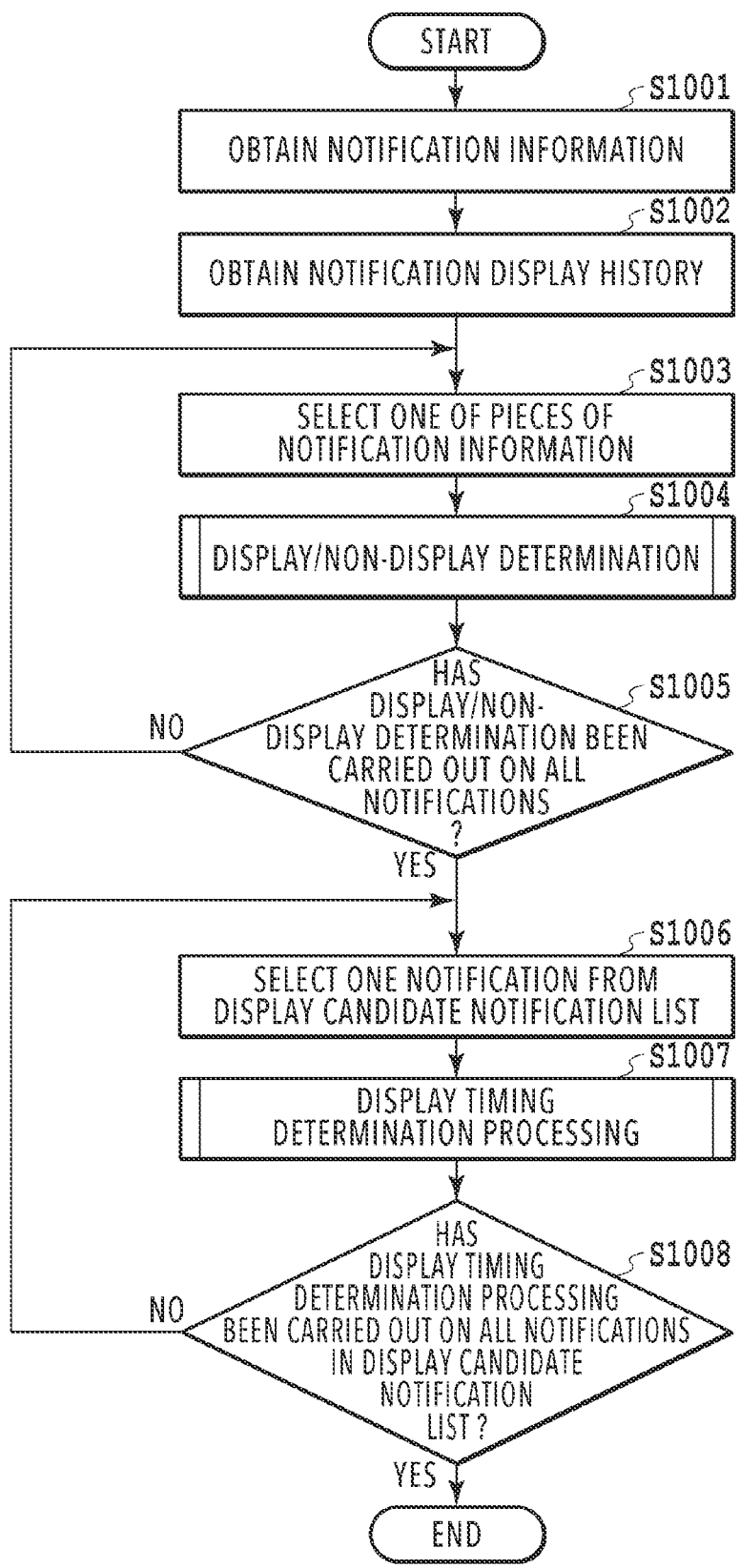
FIG. 10 is a flowchart showing details of notification display determination processing.

FIG. 10 is a flowchart showing details of the notification display determination processing carried out in S414 of FIG. 4B. In S1001, the resident application reads the notification information file stored in the terminal device 108 and obtains the notification information. If there are two or more notification information files, the resident application reads all the notification information files and obtains the notification information (the notification information set). In S1002. the resident application obtains the notification display history stored in the terminal device 108.

In S1003, the resident application selects one of the pieces of notification information obtained in S1001, and then carries out display/non-display determination processing in S1004. In S1005, the resident application checks whether or not the display/non-display determination processing has been carried out on all the pieces of notification information obtained in S1001. The processing returns to S1003 if the processing has not been completed, and the display/non-display determination processing is carried out on all the pieces of notification information. The processing proceeds to S1006 in the case where it is determined to be yes in S1005, that is, in the case where the display/non-display determination processing has been carried out on all the pieces of notification information.

Figure 11:
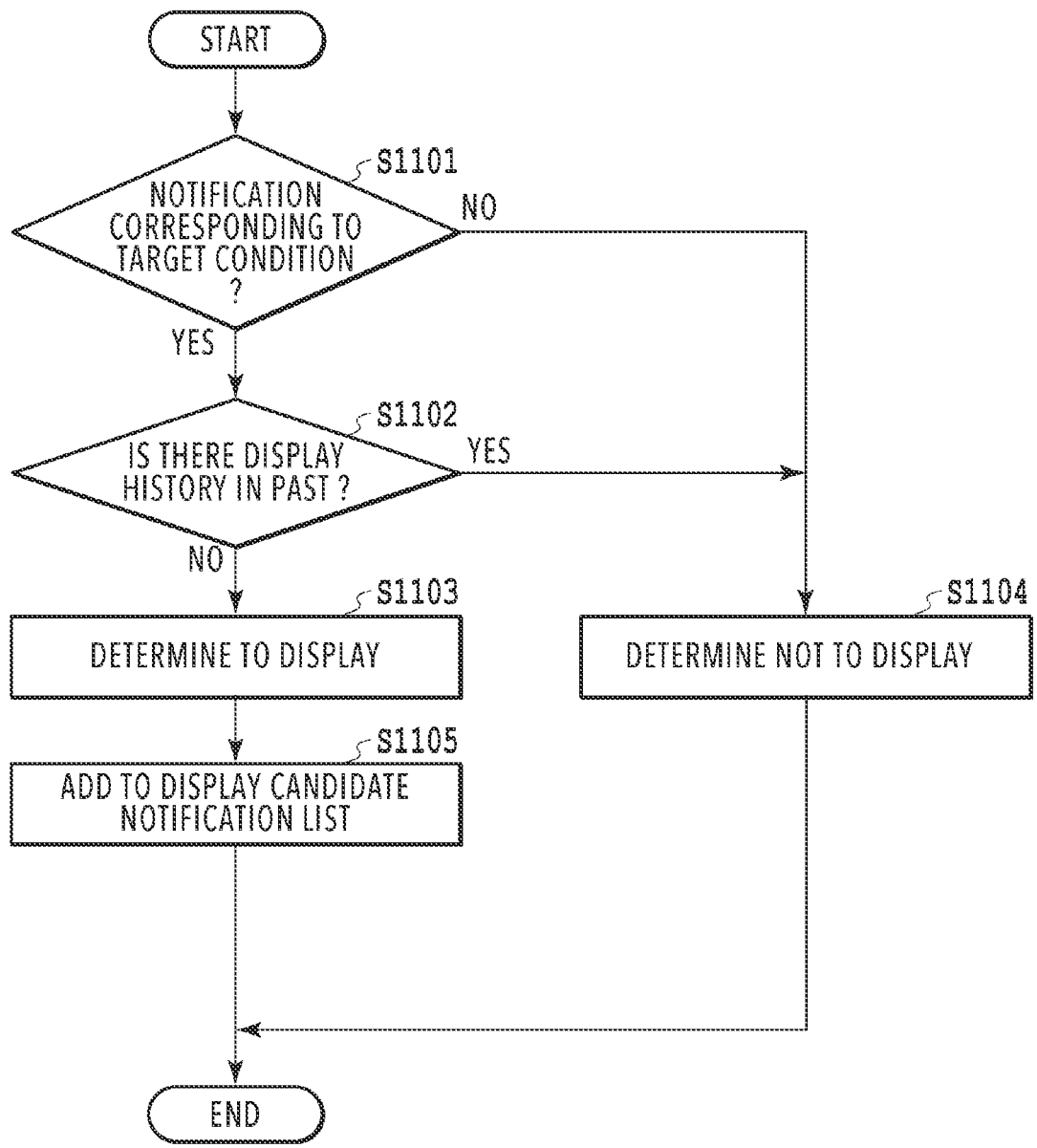
FIG. 11 is a diagram showing details of display/non-display determination processing.

FIG. 11 is a flowchart for explaining details of the display/non-display determination processing in S1004.

In S1101, the resident application checks whether or not the notification information selected in S1003 is the notification corresponding to the target condition. The determination as to whether or not the notification corresponds to the target condition can be made by referring to and checking the value of the target type in the notification information file. To be more precise, the checking is carried out as described below.

In the case where the target condition represents "all users", the resident application automatically determines the notification as the "corresponding" notification. Specifically, the resident application determines the notification as the "corresponding" notification if the value of the parameter "targetingType" in the "notification.json" file in the notification information selected in S1003 is "all".

In the case where the target condition represents the "version number", the resident application determines the notification as the "corresponding" notification if application version information on the main application held by the application is older. To be more precise, a comparison of the version information takes place if the value of the parameter "targetingType" in the "notification.json" file of the notification information selected in S1003 is "appVer". Specifically, the application version information of the main application held by the resident application is compared with the "appVerLessThan" value in the "notification.json" file. Then, the resident application determines the notification as the "corresponding" notification if the application version information on the main application held by the application is older.

In the case where the target condition is other than the above-mentioned condition, the resident application determines the notification as the "corresponding" notification if the notification information selected in S1003 is the notification information to be identified by the notification ID information that coincides with the notification ID information obtained in S413 of FIG. 4B. To be more precise, this is the processing to be carried out in the case where the value of the parameter "targetingType" in the "notification.json" file of the notification information selected in S1003 is "apiRequest". The resident application determines the notification as the "corresponding" notification if the notification information selected in S1003 is the notification information to be identified by the notification ID information that coincides with the notification ID information obtained in S413 of FIG. 4B.

As a result of the processing to be carried out is S1101 as described above, the processing proceeds to S1102 in the case where the notification is determined as the "corresponding" notification or proceeds to S1104 in the case where the notification is not determined as the "corresponding" notification. In S1104, the resident application determines that the notification information selected in S1003 is determined as "not to be displayed".

In S1102, the resident application refers to the notification display history and determines whether or not the notification information selected in S1003 has ever displayed the notification in the past. The processing proceeds to S1104 in the case where the relevant notification information has displayed the notification in the past. The processing proceeds to S1103 in the case where the relevant notification information has never displayed the notification in the past. In S1103, the resident application determines that the notification information selected in S1003 is "to be displayed". Subsequently, the processing proceeds to S1105.

In S1105, the resident application adds the notification determined as "to be displayed" to a display candidate notification list. Specifically, the display candidate notification list may be formed into a list of the notification ID information. The detailed description of the processing in S1004 in FIG. 10 has been finished.

Back to FIG. 10, the description of the flowchart will be continued. In S1006, the resident application selects one notification out of the display candidate notification list. Then, in S1007, the resident application carries out display timing determination processing. Subsequently, in S1008, the resident application checks whether or not the display timing determination processing has been carried out on all the notifications in the display candidate notification list. The processing returns to S1006 if the processing has not been completed, or terminates the flow if the processing has been completed.

Figure 12:
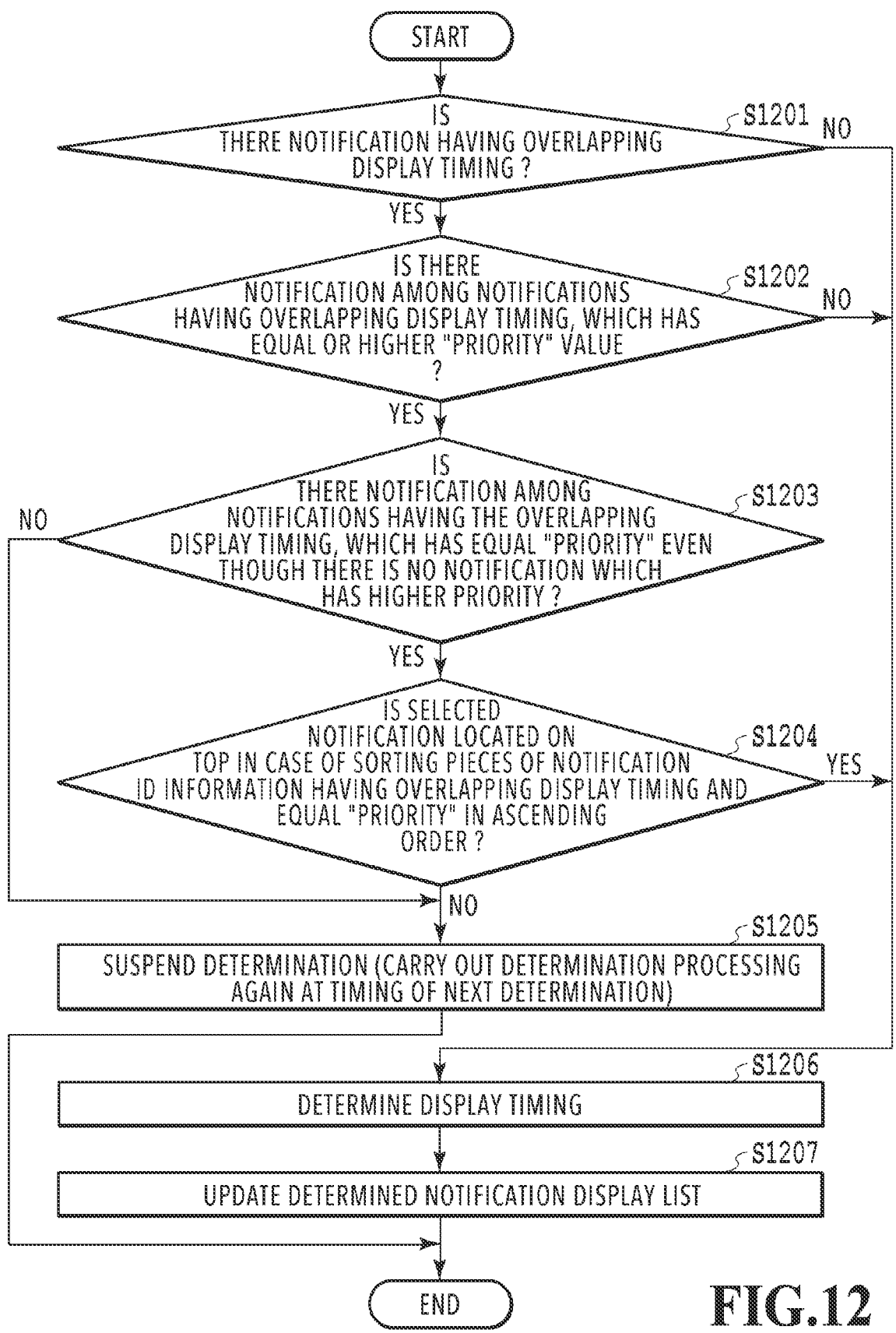
FIG. 12 is a flowchart showing details of display timing determination processing.

FIG. 12 is a flowchart showing details of the display timing determination processing to be carried out in S1007. In the display timing determination processing, the display timing is determined by comparing with other notification information in the display candidate notification list.

First, in S1201. the resident application checks whether or not there is a notification having overlapping display timing. To be more precise, the resident application checks whether or not there is a notification having the display timing which overlaps the display timing of the notification selected in S1006 by referring to the notification ID information described in the display candidate notification list. The processing proceeds to S1202 if there is the notification having the overlapping display timing, or proceeds to S1206 if there is no applicable notification. In S1206, the resident application determines (fixes) the display timing of the notification selected in S1006.

In S1202. the resident application checks whether or not there is any notification among the notifications having the overlapping display timing, which has a "priority" value that is either equal to or higher than a "priority" value of the notification selected in S1006. The processing proceeds to S1203 if there is an applicable notification or proceeds to S1206 if there is no applicable notification. In other words, if the "priority" value of the notification selected in S1006 is the highest, then the display timing of this notification takes the priority. Accordingly. the display timing is determined in S1206.

In S1203. the resident application checks whether or not there is any notification among the notifications having the overlapping display timing, which has a "priority" value that is equal to the "priority" value of the notification selected in S1006 even though there is no notification that has a higher priority. The processing proceeds to S1204 if there is an applicable notification or proceeds to S1205 if there is no applicable notification.

In S1204, the resident application checks whether or not the notification selected in S1006 among the notifications having the overlapping display timing and the same "priority" value is placed on the top in the case of sorting the pieces of the notification ID information in ascending order. The processing proceeds to S1206 if the relevant notification is placed on the top or proceeds to S1205 if the notification is not placed on the top. As described above, the present embodiment is designed to determine the display timing in accordance with the sorted order of the pieces of the notification ID information in ascending order in the case where the notifications have the overlapping display timing and the same "priority" value. However, this order may be replaced with descending order or any other order.

In S1205, the resident application suspends the determination regarding the notification selected in S1006. Then, the resident application will carry out the display timing determination processing on the relevant notification again in the next notification display determination processing. In other words, if the processing proceeds to S1205, it means that the display timing of the notification other than the notification selected in S1006 is determined on a priority basis. Accordingly, the determination processing only needs to be carried out again at the time of the next display timing determination processing.

In S1206, the resident application determines to display the notification selected in S1006 at the timing described in the notification information as discussed above. Subsequently, in S1207, the resident application writes the information determined in S1206 in the determined notification display list. Then, the notification display determination processing is terminated.

As described above, according to the present embodiment, it is possible to achieve target notification while targeting at a specific user without employing a push notification mechanism based on the OS. Meanwhile, in the present embodiment, the terminal device 108 obtains the notification information as appropriate irrespective of whether or not the user of the terminal device 108 is involved. In other words, the terminal device 108 downloads the notification information file from a prescribed DB. This notification information file is downloaded irrespective of the communication with the Web API server 104. This makes it possible to obtain the notification information efficiently while reducing involvement of the server side in the processing in the case of using a Web API or the like in association with obtainment of the notification information by the terminal device 108. For example, the server side does not have to conduct processing to distribute a notification to all the users one by one. Moreover, the use of the differential information file set can achieve obtainment of the notification information while reducing updates of the notification information and reducing an amount of communication on the application side as well.

SECOND EMBODIMENT

A second embodiment represents an embodiment including processing that involves a mode of notifying multiple times (hereinafter referred to as multiple notifications) concerning a single piece of notification information. Now, a description will be given below while focusing on configurations that are different from those in the first embodiment.

FIG. 13 is a table showing target conditions used in the present embodiment. Besides the target conditions described with reference to FIG. 5, a condition regarding a cart-abandoning user (a user who has not completed a payment yet for more than two days but less than fourteen days after having put albums into a cart) is additionally included in the target conditions in FIG. 13.

In the case where the target condition concerns a notification to the "cart-abandoning user", such a notification is displayed for each album. For example, on the assumption of setting one notification based on the target condition concerning the "cart-abandoning user" and in a case where the user has put an album A and an album B into a cart on different clock times on the same day and has not completed a payment since then, two notifications become effective four days later regarding the notification that has been set as mentioned above, namely, a notification regarding the album A and a notification regarding the album B.

Processing in the present embodiment is basically the same as the processing in the first embodiment but is partially different therefrom. A description will be given below mainly on different features. In view of the overall sequence shown in FIGS. 4A and 4B, the processing in S404 in FIG. 4A is different. In the case other than the multiple notifications, the same operation as the first embodiment takes place. In contrast, a different operation takes place in the case of the multiple notifications. In the case of the multiple notifications, the notification management server 101 registers album ID information with the notified user DB 103 in addition to the notification ID information and the user ID information.

FIG. 14 is a table showing examples of data structures to be registered with the notified user DB 103. An array of album ID information representing Item ID is further registered in the associated form with the notification ID information on the multiple notifications. Here, the album ID information is employed as the Item ID information to be used for the multiple notifications in the present embodiment. However, the Item ID information is not limited only to the album ID information. In the case of a different target condition, for instance, other ID information not restricted to the albums may be registered as the item ID information (Item ID) with the notified user DB 103.

FIG. 15 is a diagram showing an example of the notification information file (notification.json) in the case of multiple notifications. The notification information file (notification.json) is the same as that of the first embodiment except a sub-file for the multiple notifications. In the case of the multiple notifications, the "targetingType" item is defined as "apiRequestMulti" as shown in FIG. 15 and is treated as a different target type.

Meanwhile, in S412 and S413 in FIG. 4B, the album ID is also included in the information that the Web API server 104 obtains from the notified user DB 103.

FIG. 16 is a diagram showing an example of a response body to be transmitted as a response from the Web API server 104 to the resident application in S413. In the present embodiment, the response body in S413 is the same as that in the first embodiment except for the multiple notifications. In the case of the multiple notifications, the response body includes the item ID as shown in FIG. 16.

In the notification display determination processing in S414 of FIG. 4B, the processing shown in FIG. 10 is carried out as with the first embodiment. However, the display/non-display determination processing in S1004 of FIG. 10 is different from that in the first embodiment.

Figure 17:
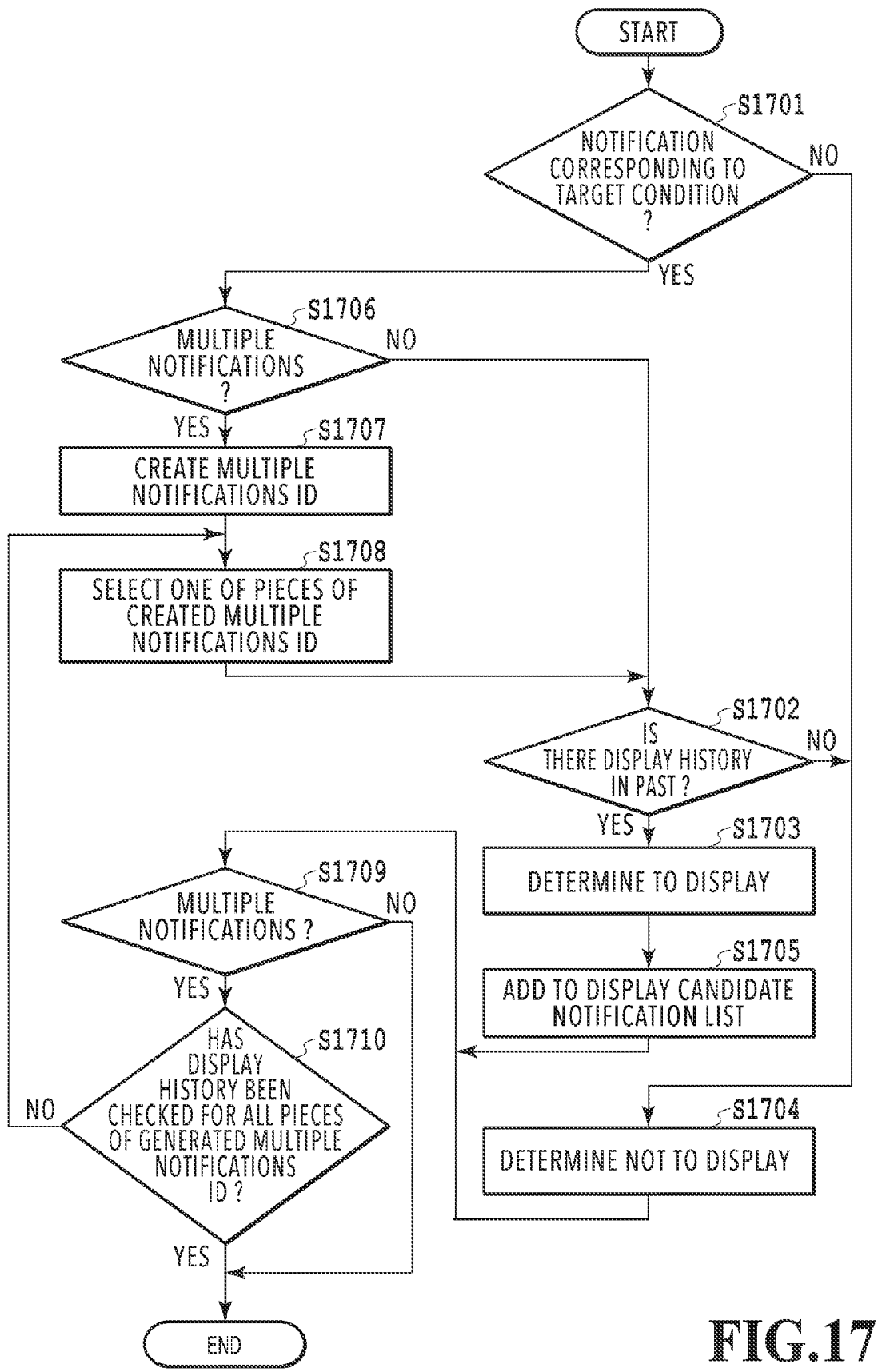
FIG. 17 is a flowchart showing details of the display/non-display determination processing.

FIG. 17 is a flowchart showing details of the display/non-display determination processing in S1004 of the present embodiment. In the present embodiment, the processing shown in FIG. 17 is carried out in S1004 instead of the processing shown in FIG. 11.

In S1701, the resident application checks whether or not the notification information selected in S1003 is the notification corresponding to the target condition. In the processing in S1701, a determination in the case where the target condition is concerning the cart-abandoning user is also carried out in addition to the processing in S1101 of FIG. 11. In other words, the following determination is carried out in the case where the value of the parameter "targetingType" of the "notification.json" file of the notification information is "apiRequestMulti". Specifically, the resident application determines the notification as the "corresponding" notification in the case of the notification information to be identified by the notification ID information coinciding with the notification ID information obtained in S413 of FIG. 4B. The processing proceeds to S1706 in the case of the notification corresponding to the target condition, or proceeds to S1704 in the case of the notification not corresponding to the target condition. The processing in S1704 is the same as that in S1104.

In S1706, the resident application determines whether or not the notification information selected in S1003 represents the multiple notifications. The processing proceeds to determination processing in S1702 in the case where the notification information does not represent the multiple notifications. The processing in S1702 is the same as that in S1102. The processing proceeds to S1707 in the case where the notification information represents the multiple notifications. In S1707, the resident application creates new ID information (this ID information will be hereinafter referred to as multiple notifications ID information) for processing the notifications separately depending on the pieces of the album ID information in the multiple notifications. The multiple notifications ID information is created as a character string by coupling the album ID information to the notification ID information with "_" (underbar) such as "(the album ID)_(the notification ID)". However, the album ID and the notification ID are assumed to be included in advance in the notification information file in the form of character strings not containing "_" (underbar). In the case where there are two or more pieces of the album ID information, the pieces of the multiple notifications ID information are created as many as the number of pieces of the album ID information. Then, the processing proceeds to S1708.

In S1708, the resident application selects one of the pieces of the multiple notifications ID information created in S1707, and then the processing proceeds to S1702. In other words, in the case of the multiple notifications, the processing is carried out by using the multiple notifications ID information.

The processing from S1702 to S1705 is the same as the processing from S1102 to S1105 of FIG. 11. Note that the multiple notifications ID information is added to the list in S1705 in the case of the multiple notifications. After S1705 or S1704, the processing proceeds to S1709.

In S1709, the resident application checks whether not the notification currently targeted for the processing represents the multiple notifications. The resident application terminates this flow in the case where the notification does not represent the multiple notifications. The processing proceeds to S1710 in the case of the multiple notifications.

In S1710, the resident application checks whether or not the display history has been checked in terms of all the pieces of multiple notifications ID information created in S1707. The processing proceeds to S1708 in the case where all the pieces of the multiple notifications ID information have not been checked yet, and this flow is terminated in the case where all the pieces of the multiple notifications ID information have been checked.

Meanwhile, in the case where the notification information on the multiple notifications is referred to in the display timing determination processing of FIG. 12, the multiple notifications ID information is split at "_" (underbar) so as to obtain the notification information on the original notification ID information. Except the above-described point, the display timing determination processing in the present embodiment is the same as that in the first embodiment. The multiple notifications can be realized by the above-described configuration.

As described above, the present embodiment can realize the multiple notifications. In this way, it is possible to realize the notification associated individually to a unique target such as each album without having to create the notification information file one by one.

OTHER EMBODIMENTS

In the above-described embodiments, various databases and servers have been used as examples of the devices on the server side. Instead, part of these functions may be realized by using a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to this disclosure, it is possible to reduce processing costs and communication costs on a server side, and to display an appropriate notification on a user terminal without using a push notification function based on an OS.

This application claims the benefit of Japanese Patent Application No. 2020-152080, filed Sep. 10, 2020, which is hereby incorporated by reference wherein in its entirety.

What is claimed is:

1. An information processing apparatus capable of communicating with a cloud storage and a cloud server,
   wherein the cloud storage stores notification contents each of which are associated with first notification identification information for identifying each of the notification contents, and
   wherein the cloud server can access a management unit that manages second notification identification information associated with user identification information of a user to which each of the notification contents corresponding to the second notification identification information is to be notified, and
   wherein the information processing apparatus comprises:
   a memory that stores instructions; and
   a processor that executes the instructions to perform:
      obtaining the notification contents and the first notification identification information associated with each other from the cloud storage;
      transmitting user identification information corresponding to a user of the information processing apparatus to the cloud server in a case where the processor obtains the notification contents and the first notification identification information from the cloud storage;
      obtaining, from the cloud server, the second notification identification information which is acquired from the management unit by the cloud server based on the transmitted user identification information; and
      controlling a display to display, from the obtained notification contents, a notification content corresponding to the obtained second notification identification information.

2. The information processing apparatus according to claim 1, wherein the processor obtains the notification contents and the first notification identification information from the cloud storage before obtaining the second notification identification information from the cloud server.

3. The information processing apparatus according to claim 1, wherein the processor obtains the notification contents and the first notification information from the cloud storage without determining whether or not the obtained notification contents is targeted at the user of the information processing apparatus.

4. The information processing apparatus according to claim 1, wherein the processor obtains a set of the notification contents and the first notification information from the cloud storage in a case where a new version of the set of the notification contents and the first notification information is stored in the cloud storage.

5. The information processing apparatus according to claim 4, wherein the processor does not obtain the set of the notification contents and the first notification information from the cloud storage in a case where the new version of the set of the notification contents and the first notification information is not stored in the cloud storage.

6. The information processing apparatus according to claim 1, wherein the processor transmits the user identification information and the first notification identification information to the cloud server.

7. The information processing apparatus according to claim 1, wherein
   the processor obtains, from the cloud storage, a set of the notification contents, the first notification information, and a target type indicating a type of a target, and
   in a case where the processor obtains the set of the notification contents, the first notification identification information, and the target type from the cloud server, and where target type indicates that the notification content is of a type required to be checked on a server side, the processor transmits the user identification information to the cloud server.

8. The information processing apparatus according to claim 1, wherein
   the management unit manages the second notification identification information associated with the user identification information and unique item identification information,
   the processor obtains, from the cloud server, the second notification identification information and the item identification information associated with the second notification identification information, and
   in a case where there is the item identification information associated with the second notification identification information, the processor determines the notification information of the display target by using identification information that combines the second notification identification information with the item identification information.

9. The information processing apparatus according to claim 1, wherein
   the management unit manages the second notification information associated with the user identification information on a user corresponding to the target condition extracted from a database that collects any of attribute information and action information on users.

10. The information processing apparatus according to claim 1, wherein the processor controls the display to display, from the obtained notification contents, the notification content corresponding to the obtained second notification identification information.

11. The information processing apparatus according to claim 1, wherein, in a case where there are pieces of the notification information of the display target having overlapping display timing, the processor controls the display to display the notification content corresponding to the obtained second notification identification information in such a way as to display sequentially from the notification content having a higher priority in accordance with a predetermined condition.

12. The information processing apparatus according to claim 1,
wherein the processor controls the display to display the notification content corresponding to the obtained second notification identification information in accordance with information on display timing included in the notification information.

13. A method of controlling an information processing apparatus capable of communicating with a cloud storage and a cloud server, wherein the cloud storage stores notification contents each of which are associated with first notification identification information for identifying each of the notification contents, and wherein the cloud server can access a management unit that manages second notification identification information associated with user identification information of a user to which each of the notification contents corresponding to the second notification identification information is to be notified, comprising:
obtaining the notification contents and the first notification identification information associated with each other from the cloud storage;
transmitting user identification information corresponding to a user of the information processing apparatus to the cloud server in a case where the notification contents and the first notification identification information are obtained from the cloud storage;
obtaining, from the cloud server, the second notification identification information which is acquired from the management unit by the cloud server based on the transmitted user identification information; and
controlling a display to display, from the obtained notification contents, a notification content corresponding to the obtained second notification identification information.

14. An information processing system comprising:
a cloud storage that stores notification contents each of which are associated with first notification identification information for identifying each of the notification contents;
a cloud server that can access a management unit that manages second notification identification information associated with user identification information of a user to which each of the notification contents corresponding to the second notification identification information is to be notified; and
an information processing apparatus comprising:
a memory that stores instructions; and
a processor that executes the instructions to perform:
obtaining the notification contents and the first notification identification information associated with each other from the cloud storage,
transmitting user identification information corresponding to a user of the information processing apparatus to the cloud server in a case where the processor obtains the notification contents and the first notification identification information from the cloud storage;
obtaining, from the cloud server, the second notification identification information which is acquired from the management unit by the cloud server based on the transmitted user identification information, and
controlling a display to display, from the obtained notification contents, a notification content corresponding to the obtained second notification identification information.

* * * * *